United States Patent [19]

Hall et al.

[11] 4,391,361

[45] Jul. 5, 1983

[54] HOLD-DOWN APPARATUS FOR CABLE CONVEYORS

[75] Inventors: Benjamin O. Hall; Thomas W. Arndt, both of Oskaloosa, Iowa

[73] Assignee: Intraco, Inc., Oskaloosa, Iowa

[21] Appl. No.: 270,629

[22] Filed: Jun. 4, 1981

[51] Int. Cl.³ .............................................. B65G 19/28
[52] U.S. Cl. ................................. 198/735; 119/51 CF
[58] Field of Search ............... 198/735, 728, 837, 843; 474/111; 119/51 CF

[56] References Cited

U.S. PATENT DOCUMENTS

| 2,554,589 | 5/1931 | Patz et al. | |
| 2,717,520 | 9/1935 | Imse | 474/111 |
| 2,757,783 | 8/1936 | Zacur | |
| 2,934,199 | 4/1960 | Winkler | 19/52 |
| 3,918,405 | 11/1975 | Hostetler | 119/52 AF |
| 3,962,996 | 6/1976 | Jones et al. | 119/51 |
| 4,207,838 | 6/1980 | Pirovano | 198/837 X |

FOREIGN PATENT DOCUMENTS

| 899738 | 5/1972 | Canada | |
| 628803 | 9/1949 | United Kingdom | 474/111 |

*Primary Examiner*—James L. Jones, Jr.
*Assistant Examiner*—Douglas D. Watts
*Attorney, Agent, or Firm*—Henderson & Sturm

[57] ABSTRACT

A conveying apparatus of a type including a flexible endless member having material engaging discs disposed on the flexible endless member for catching material and moving the material in response to movement of the flexible endless member and the material engaging discs wherein the flexible endless member is disposed within a channel member around the flexible endless member and the material engaging discs for confining material for transportation from place to place. A drive unit is provided for selectively causing the flexible endless member to be pulled through said channel. The channel includes a pair of opposed sidewalls and a bottom wall. A plurality of hold-down devices are connected to an upper portion of the opposed sidewalls and are disposed at intervals along the sidewalls for holding the material engaging discs and the flexible endless member in the channel. The hold-down devices include a mounting bracket attached to the channel and a spring steel strap formed in a loop and connected at the ends thereof to the mounting bracket. The steel strap extends into and along the channel for resiliently pushing against the flexible endless member.

6 Claims, 8 Drawing Figures

U.S. Patent Jul. 5, 1983 4,391,361
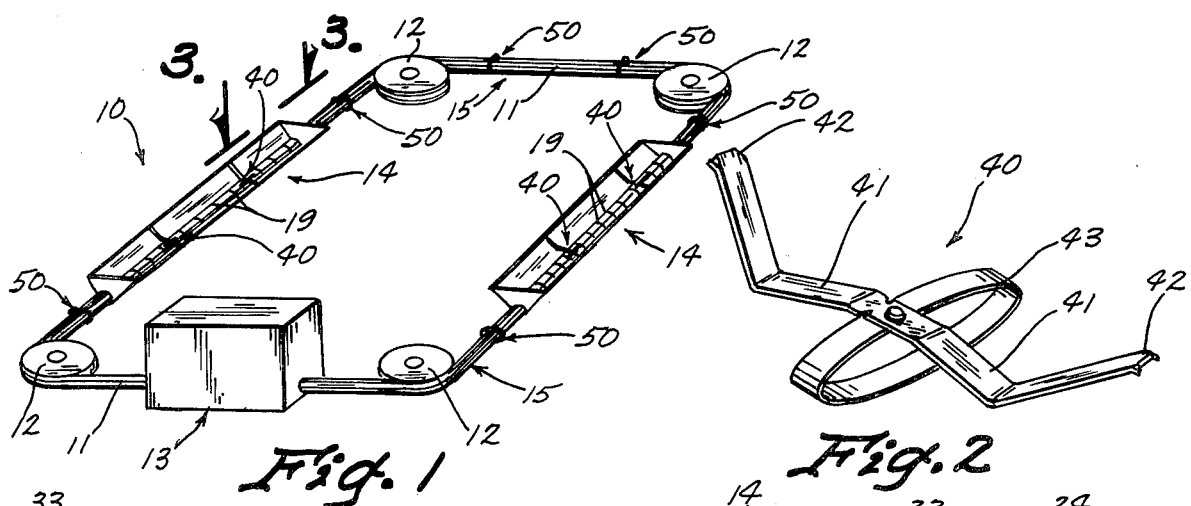
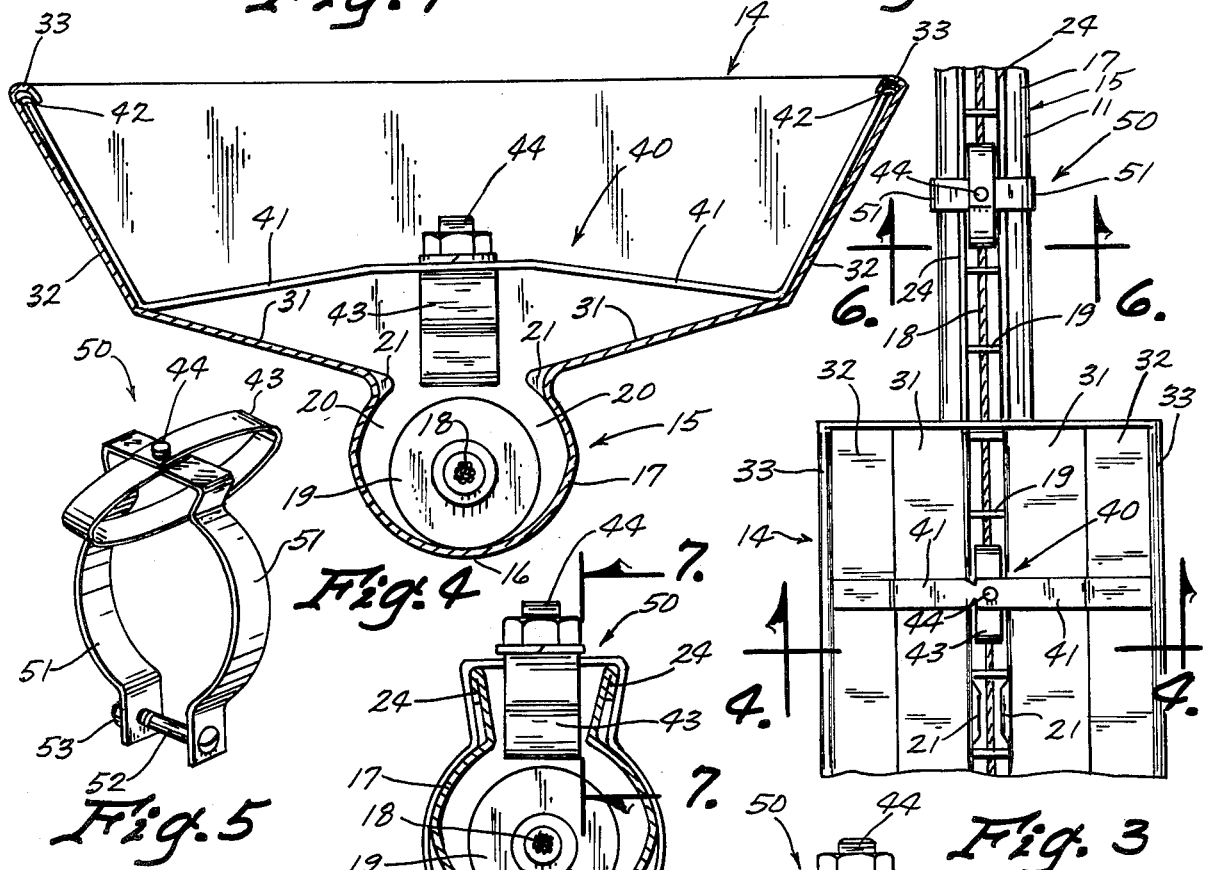
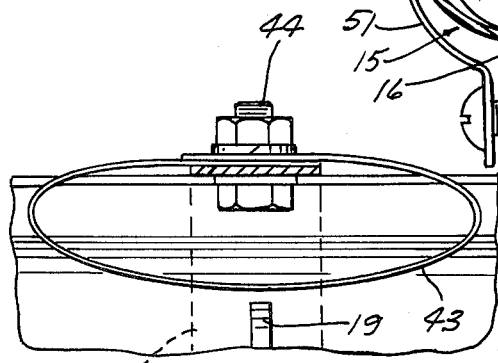

HOLD-DOWN APPARATUS FOR CABLE CONVEYORS

BACKGROUND OF THE INVENTION

The present invention relates generally to a conveyor system of a type having a channel for confining and conveying granular or powdery materials and having a flexible member disposed therein which is movable within the channel, and more particularly to a hold-down apparatus for holding the flexible conveyor member down within the material to be conveyed.

In the type of conveyor system referred to above, there exists a general problem that when the material being conveyed gets slightly moist or tends to stick together for any reason, the flexible conveyor member, riding in the channel, tends to be pushed upwardly and rides over the top of such material which is sticking together, thereby leaving it behind and tending to allow it to build-up. This build-up of material then tends to cause problems because it quite often will spoil, if it is an organic type of material such as poultry feed or the like. One solution in the prior art to this problem has been to merely make the channel smaller. In the type of conveyors having a tube for a channel, smaller tubes have been used to prevent the cable with the inserts thereon from riding up over certain matted material, but the problem with this approach has been that when the cable and inserts go through the channel to complete the circuit necessary for operation, there is generated an unacceptable amount of friction and quite often the drive unit is unable to pull the cable through the tube or channel. Even if a large enough drive unit is used, inordinate wear results from such an arrangement. Consequently, it is apparent that there is a need for structures which will overcome the problem of the cable riding up over the material which is tending to stick together or adhere to the bottom of the channel or tube, while at the same time to overcome the frictional problems associated with prior art attempts to overcome this problem.

A still further problem in the above-identified conveying art is encountered when this type of conveying system is utilized for feeding poultry or the like within a poultry house. Typically, a poultry feeding conveyor apparatus of this type would have a circuitous tube or channel having a cable with inserts thereon disposed around through the circuitous channel or tube. There would, of course, be a typical drive unit attached thereto, for pulling the cable through the channel or tube, a hopper for introducing poultry feed into the conveyor system and a structure at each cage for distributing feed to each cage for feeding the birds therewithin.

There are numerous poultry feeding troughs which have been utilized in connection with such a system, and one of such poultry feeding trough is shown in U.S. Pat. No. 4,207,838. This patent shows a structure wherein a portion of the channel or tubular structure for conveying the poultry feed is substantially open at the top, thereby having the cable with the inserts thereon exposed and allowing the birds to feed directly therefrom. The walls of the channel are extended upwardly and outwardly at this point to provide for catching poultry feed which drops out of the mouth of the poultry or which is caused to be thrown out of the bottom of the channel structure during the bird's eating process. In the above-mentioned patent, a special wire hold-down apparatus is attached at spaced intervals along the open feeding trough for holding the cable and inserts down into and near the bottom of the channel structure, while at the same time providing an open space for the birds to feed. One problem associated with this structure is the special and additional welding, soldering, riveting or the like which is necessary, and the additional manufacturing costs due to this labor and materials, as well as the forming cost of the wire member that is attached thereto.

One solution to the above identified problem is disclosed in co-pending U.S. patent application Ser. No. 180,139, now pending.

SUMMARY OF THE INVENTION

The present invention relates to a conveying system of a type including a flexible endless member, circular material engaging inserts disposed on the flexible endless member for catching material and moving the material in response to movement of the endless flexible member and the material engaging inserts. A channel is disposed at least partially around the flexible endless member and the material engaging inserts for confining material for transportation from place to place. A drive unit is provided for selectively causing the flexible endless member to be pulled through the channel. The channel has a pair of opposed sidewalls, a bottom wall and a steel strap, loop shaped, hold-down device connected to an upper portion of the pair of opposed sidewalls for biasing the circular material engaging inserts and the flexible endless member down into the channel.

An object of the present invention is to provide an improved hold-down apparatus for conveyors of the type generally referred to above.

Another object of the invention is to provide a cable hold-down apparatus which causes all of the material to be conveyed to actually be conveyed and eliminating the problem of the cable or other equivalent structure riding up over certain material which has stuck together.

A further object of the invention is to provide the above identified hold-down structure, while also eliminating the problem of having an inordinate amount of friction associated with the solution of the hold-down problem.

Still another object of the invention is to provide an improved feeding trough structure for poultry.

Still another object of the invention is to provide a feeding trough structure for poultry which is cheap and economical to manufacture, while being dependable and reliable in its use.

Other objects, advantages, and novel features of the present invention will be apparent from the following detailed description of the invention when considered in conjunction with the accompanying drawings.

BRIEF DESCRIPTION OF THE DRAWINGS

FIG. 1 shows a perspective view of the environment of the present invention.

FIG. 2 shows a perspective view of one embodiment of the present invention.

FIG. 3 shows a plan view of the present invention installed in a conveying system.

FIG. 4 is a cross-sectional elevational view of the invention taken along line 4—4 of FIG. 3.

FIG. 5 is a perspective view of another embodiment of the present invention.

FIG. 6 is a cross-sectional elevational view taken along line 6—6 of FIG. 3.

FIG. 7 is a cross-sectional elevational view taken along line 7—7 of FIG. 6.

FIG. 8 is a view similar to FIG. 6 but showing the invention employed with a slightly differently shaped channel.

DESCRIPTION OF THE PREFERRED EMBODIMENTS

Referring now to the drawings wherein like reference numerals designate identical or corresponding parts throughout the several views, FIG. 1 shows a schematic view of a cable conveying system 10 constructed in accordance with the present invention. In general, what is shown in FIG. 1 is a circuitous channel-like structure 11 having conventional idler-type corner structures 12 attached thereto for reducing friction for going around such corners, a combination drive unit and hopper unit 13 for pulling the cable with inserts 19 thereon around and through the system, and also for introducing granular or powdery materials, such as poultry food, into the system. Typically, the drive unit and hopper unit are separate, but since they form no part of this invention, they are shown schematically as one unit. A cage feeding trough 14 is disposed within the system for the purpose of feeding poultry.

Referring now to FIGS. 3 and 4, the poultry feeding trough 14 can be seen in more detail. Looking to FIG. 4, it is noted that a channel 15 is formed on the bottom of trough 14. This channel 15 has a bottom wall 16 and sidewalls 17. An endless cable 18 is disposed within the channel 15 and has a plurality of circular material engaging inserts 19 which are rigidly attached to cable 18 at evenly spaced intervals. Typically, these material engaging inserts are made of nylon or some other type of wear-resistant plastic material. It should be noted, however, that other types of endless conveyor structures can be used. It is also noted that there is a space 20 provided on each side of the material engaging inserts 19 for the purpose of reducing friction.

The hold-down nodules 21, shown in FIGS. 3 and 4, can be optionally integrally formed into the cage feeding trough 14 during the sheet metal forming process are disclosed more completely in U.S. patent application Ser. No. 180,139 referred to above, and they form no part of the present invention. The hold-down nodules 21 are an alternative for the hold-down structures 40 and 50 of the present invention.

FIGS. 2, 3 and 4 show hold-down devices 40 which include a metal bracket 41 having upwardly extending arms terminating in ends 42 which are frictionally held in place under the lip 33 of the trough 14 as can be seen in FIG. 4. The bracket 41 is just snapped into place in the trough 14 as can readily be seen from viewing FIG. 4. The center of member 41 has an aperture (not shown), and a spring steel strap member 43, having an aperture (not shown) in each end, is bent into a loop and then fastened to the center of the member 41 by a bolt and nut assembly 44 installed through the aligned apertures.

As can be appreciated by viewing FIG. 4, the strap 43 resiliently engages the discs 19, forcing them downwardly into channel 15 and thereby eliminating the problem identified above by preventing the discs 19 from riding up and over material which would otherwise gather on the bottom of channel 15. Hold-down devices 40, thus comprise a means for resiliently engaging the discs 19 and biasing them down into channel 15.

The hold-down devices 40 are spaced along the length of the cage feeding trough 14 by whatever distance is necessary to properly hold the cable and inserts, 18 and 19, respectively, down into the channel 15. The hold-down devices 40 are, however, spaced apart sufficiently to give the poultry room to feed from the feeding trough 14.

Referring now to FIG. 6, a second embodiment 50 is shown. This embodiment is also shown in the upper portion of FIG. 3. In conveying systems of the type involved, an open type of channel 11 is commonly employed. Note that the open type channel 11 of FIG. 6 is noncircular in cross-section, but that other open type channels, such as the channel 28 of FIG. 8, are also commonly used and do have substantially circular cross-sections. The invention 50 can be employed with either of these open channel types 11 or 28.

The FIG. 6 embodiment is essentially the same as the embodiment shown in FIG. 4, except that it is not installed in a feed trough, but instead is installed in an open type conveyor channel 11 (or 28). Channel 11 (or 28) has a top portion 24, which is of a shape suitable for receiving an optional cover plate (not shown). The hold-down structure 50 shown in FIG. 5 is secured over this top portion 24.

The hold-down device 50 includes a sheet metal bracket 51 which generally conforms to the outside of the tube 11, or 28, of FIGS. 6 and 8. A bolt 52 and nut 53 are used to clamp the lower ends of the bracket 51 together to be held tightly onto the conveyor tube 11, or 28. The top center of the bracket 51 has an aperture, and a spring steel strap with apertures in each end is looped and bolted onto the bracket 51 in the manner shown in FIG. 5 and as discussed above with respect to the hold-down structure 40 of FIG. 2. The function of the FIGS. 6 and 8 embodiments are substantially identical in that the discs 19 and thereby the cable 18 are held resiliently downwardly and prevented from moving upwardly too far, thereby preventing the accumulation of material at the bottom of the feed tube, while at the same time reducing the frictional problems that would be inherent in trying to hold-down the cable by merely having a smaller diameter standard conveyor tube. The spaces 20 optionally provided at the sides, allow for material to accumulate somewhat at the sides and not overwork the system or cause excessive friction; and, futhermore this feed will, by gravity, drop downwardly and be carried by the conveyor system when the conveyor system becomes depleted.

It can, thus, be appreciated that the hold-down devices 50, like the devices 40, comprise a means for resiliently engaging the discs 19 to bias them into the channel 15.

Obviously, many modifications and variations of the present invention are possible in light of the above teachings. It is therefore to be understood that, within the scope of the appended claims, this invention may be practiced otherwise than as specifically described.

We claim:

1. In a conveying apparatus of a type including a flexible endless member, material engaging means disposed on said flexible endless member for catching material and moving the material in response to movement of the flexible endless member and said material engaging means, channel means disposed at least partially around said flexible endless member and said material engaging means for confining material for transportation from place to place, said channel means having a pair of opposed sidewalls, and means for selectively causing said flexible endless member to be pulled through said channel means, an improvement comprising:

means for resiliently engaging said material engaging means to bias said material means into said channel means, said resilient engaging means being secured to an upper portion of said pair of opposed sidewalls and comprising a mounting bracket attached to said opposed sidewalls and a loop shaped spring member secured to said mounting bracket; said spring member extending into said channel means for resiliently pushing against said material engaging means.

2. Apparatus as defined in claim 1, wherein said resilient engaging means comprises a plurality of said loop spring hold-down devices secured at intervals along said channel means for biasing said material engaging means and said flexible endless member into said channel means.

3. Apparatus as defined in claim 2, each of said hold-down devices includes a clamping means for tightly and frictionally securing said bracket to said channel at any desired location along the length of said channel means, said loop-shaped springs extending into said channel means for resiliently engaging material engaging means of said endless member.

4. The apparatus as defined in claim 1, wherein said resilient engaging means is secured to a bracket, said bracket being frictionally secureable about the exterior of said channel means.

5. In a conveying apparatus of a type including a flexible endless member, material engaging means disposed on said flexible endless member for catching material and moving the material in response to movement of the flexible endless member and said material engaging means, channel means disposed at least partially around said flexible endless member and said material engaging means for confining material for transportation from place to place, said channel means having a pair of opposed sidewalls and a trough means attached to the upper portion of said pair of opposed sidewalls, said trough means including a pair of opposite walls extending upwardly and outwardly from said channel means for preventing feed loss when poultry are feeding from said channel means, means for selectively causing said flexible endless member to be pulled through said channel means, an improvement comprising:

means for resiliently engaging said material engaging means to bias said material engaging means into said channel means, said resilient engaging means comprising one or more loop spring hold-down devices secured at intervals along said channel means for biasing said material engaging means and said flexible endless member into said channel means and wherein each of said hold-down devices includes a loop-shaped spring secured to a mounting bracket, said brackets being secured to opposite walls of said trough.

6. Apparatus as defined in claim 5 wherein said opposite walls of said trough means have grooves provided therein, and opposite ends of said brackets are frictionally disposed in said grooves, said brackets including intermediate portions which correspond to and follow the contour of said trough means and extend over said channel means.

* * * * *